(12) United States Patent
Pecher

(10) Patent No.: US 8,983,786 B2
(45) Date of Patent: Mar. 17, 2015

(54) METHOD FOR DETERMINING A DRIVE POSITION OF AN ELECTRIC DRIVE

(75) Inventor: Franz Pecher, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 521 days.

(21) Appl. No.: 13/363,444

(22) Filed: Feb. 1, 2012

(65) Prior Publication Data

US 2012/0197573 A1    Aug. 2, 2012

(30) Foreign Application Priority Data

Feb. 2, 2011 (DE) .......................... 10 2011 003 539

(51) Int. Cl.
   *B25J 9/16* (2006.01)
(52) U.S. Cl.
   CPC ..... *B25J 9/1692* (2013.01); *G05B 2219/39024* (2013.01); *G05B 2219/39049* (2013.01); *G05B 2219/39466* (2013.01)
   USPC .......................................................... 702/89
(58) Field of Classification Search
   CPC ..................................................... B25J 9/1692
   USPC .............................................................. 702/89
   See application file for complete search history.

(56) References Cited

U.S. PATENT DOCUMENTS 6,101,876 A * 8/2000 Brooks et al. .................. 73/468

FOREIGN PATENT DOCUMENTS

| DE | 199 17 896 A1 | 10/1999 |
| DE | 10 2004 015 704 B3 | 10/2005 |
| DE | 10 2006 016 196 A1 | 10/2007 |
| EP | 2 011 598 A2 | 1/2009 |
| WO | 03/008145 A1 | 1/2003 |
| WO | 2004/113011 A1 | 12/2004 |

OTHER PUBLICATIONS

German Patent and Trademark Office; Search Report in German Patent Application No. 10 2011 003 539.7 dated Dec. 19, 2011; 5 pages.

* cited by examiner

*Primary Examiner* — Bryan Bui
(74) *Attorney, Agent, or Firm* — Wood, Herron & Evans, LLP

(57) ABSTRACT

A method for referencing a drive position of an electric drive of a gripper half of a production gripper in a closed position of two gripper halves includes closing the open gripper halves, determining multiple actual positions of an electric drive and tracking error values of the electric drive in a time interval during the closing of the gripper halves until beyond a point in time in which the closed position is reached, determining a straight line based on the ascertained tracking error values depending on a related time-tracking-error function, determining the instant of the zero crossing of the straight line of the time-tracking-error function, and determining the actual position of the electric drive that corresponds to the instant of the zero crossing of the straight line of the time-tracking-error-function. A production gripper and a respective control device for operating the production gripper are set up to carry out such a method.

12 Claims, 2 Drawing Sheets

METHOD FOR DETERMINING A DRIVE POSITION OF AN ELECTRIC DRIVE

TECHNICAL FIELD

The invention relates to methods for referencing a drive position of an electric drive of at least one gripper half of a production gripper in a closed position of two gripper halves and a system of a production gripper, in particular a welding tongs, clinch tongs or crimping tool and a respective control device for operating the production gripper, which is set up to carry out a method of such a gripper.

BACKGROUND

WO 03/008145 A1 discloses a calibration method for an electrical resistance welding apparatus. The resistance welding apparatus has welding tongs guided by a robot, having one or more movable electrode arms with electrodes. The resistance welding device is calibrated by means of a force sensor that measures the electrode force between the electrodes of the welding tongs.

SUMMARY

The object of the invention is to specify a simple method for referencing a drive position of an electric drive of at least one gripper half of a production gripper, in particular a welding tongs, clinch tongs or crimping tool, in a closed position of two gripper halves.

The object of the invention is fulfilled by a method for referencing a drive position of an electric drive of at least one gripper half of a production gripper in a closed position of two gripper halves, having these steps:

closing of the two gripper halves by electric-motor operation of the electric drive;

multiple determination of the actual position of the at least one electric drive and of tracking error values of the electric drive in a time interval during the closing of the gripper halves continuing beyond a point in time in which the closed position is reached;

determination of a straight line, in particular by means of an adjustment computation on the basis of the ascertained tracking error values, depending on a corresponding time-tracking-error function, starting from tracking error values at the end of the time interval;

determination of the instant of the zero crossing of the ascertained straight line of the time-tracking-error function; and determination of that actual position of the at least one drive as the closed position that corresponds to the instant of the zero crossing of the straight line of the time-tracking-error function.

The electric drive may have at least one electric motor and at least one corresponding power electronics system. The motor and power electronics in this case may form components of a regulated electric drive. Deviations of the actual values of positions of the electric drive from target values may be tracking error values of the regulated electric drive.

The production gripper may be for example a welding tongs, a clinch tongs or crimping tool. However, the production gripper may also be understood as a gripping tool or gripper, in particular for assembly in conjunction with the manufacturing of a product. Each gripper half has a contact element. The two contact elements can be moved by moving either a single one or both gripper halves toward each other and away from each other. In order to move one or more gripper halves, a drive may be provided that has for example an electric motor and optionally a gear unit. The electric motor may be actuated or regulated by means of a drive controller.

Because of a connection determined by the engineering design, a position of a gripper half corresponds to a particular position of the electric motor of the corresponding drive. The closed position of the production gripper corresponds in this case to a particular drive position. By means of a method according to the invention, it is possible to determine the drive position that corresponds to the closed position of the production gripper. Since the closed position of the production gripper, in particular in the case of a welding tongs, is subject to drift, due for example to burning off of the contact electrodes of the welding tong halves, the drive position that corresponds to the actual closed position of the production gripper must be redetermined regularly. Such a redetermination may be referred to as adjusting or referencing in particular in the automated welding technology or in the robot technology. In general, adjusting or referencing may also be understood as calibration. Thus all embodiments of the invention may also be understood as methods for calibrating a drive position of an electric drive of at least one gripper half of a production gripper in a closed position of two gripper halves.

By means of a method according to the invention, a force-sensorless referencing in particular may be done, i.e., without the use of a force sensor. That is, the production gripper may be designed without a force sensor, which is otherwise usually needed to detect a closed position.

The method assumes that the production gripper is open. Before closing the two open gripper halves by electric-motor operation of the drive, there can be provision for opening the production gripper if necessary, in particular in the case of a production gripper that is already closed.

During the multiple determination of the actual positions of the at least one drive in a time interval during the closing of the gripper halves, for each position value representing the particular actual position a corresponding time value can be assigned, in particular stored, in particular the time value for the instant of the measurement.

After the particular actual position of the at least one drive is determined, in particular calculated, as the closed position, this actual position can be assigned as the current or new closed position to a controller of the production gripper, in particular stored, i.e. saved, in a control device that actuates the production gripper.

In one embodiment of the method, the closed position of the two gripper halves can be reached at the moment of mutual contact of two contact elements of the two gripper halves.

In another embodiment of the method, the closed position of the two gripper halves can be reached at the moment when the contact elements of the two gripper halves touch opposite sides of a measurement body of known size. From the known size and/or shape of the measurement body and the opening width of the two gripper halves occurring in this closed position, it is possible on the basis of the geometric design conditions at the production gripper to draw conclusions about, in particular to calculate the actual closed position, i.e., about the closed position at which the two contact elements of the two gripper halves are closed to mutual contact.

In all embodiments of the method, a determination of the straight line can be performed, in particular a regression line, through regression as an adjustment computation, in particular using known mathematical algorithms.

A regression of a tracking error can be calculated in this case up to the moment boundary, in order to draw conclusions about a contact position of the gripper or tong tool after the contact position has been passed.

In another embodiment, the step of determining the regression of the tracking error involves the determination of a regression line. The regression line in this case may approach tracking error values which rise for example uniformly, and express them as a function. In addition, the regression line represents an especially easily determinable regression of the tracking error.

Furthermore, the regression line can be used starting from an ascertained tracking error value until the moment boundary is reached. Before the moment boundary is reached and a predetermined welding force is applied by the welding tongs, the welding tongs first touches with its gripper arms the workpiece to be welded, before the actual build-up of the welding force occurs. Such a regression line can therefore be especially suitable in embodiments, in order to draw conclusions about a contact point of the welding tongs.

In all embodiments of the method, the multiple determination of the actual positions of the at least one drive and/or of the tracking error values of the electric-motor-actuated drive can be done in predefined, in particular constant position steps and/or time steps. All actual positions, tracking error values and time values can be stored, in particular saved or stored in a controller of the production gripper.

In one variant, the actual positions and the tracking error values can be determined time-synchronously. For example, one actual position and one corresponding tracking error value can be determined and stored at the same point in time.

In all embodiments of the method, the closing of the two open gripper halves can be done by electric-motor operation of the drive at a constant speed, in particular a constant rotational speed of an electric motor which operates the drive. Thereby, in embodiments, disturbances such as possibly occurring frictional forces, which may result in an offset of a tracking error signal or a brief elevation of the tracking error signal, can be at least partially compensated for or substantially eliminated.

The actual position of the at least one drive determined as the closed position, which corresponds to the instant of the zero crossing of the straight line of the time-tracking-error function, can be determined using a mean tracking error, a gradient of the regression line of the tracking error, and/or a tracking error offset.

The production gripper may be for example a welding tongs, a clinch tongs or a crimping tool.

In the case of a welding tongs, the gripper halves are formed by welding tong halves, which have contact electrodes as contact elements.

In the case of a clinch tongs, the gripper halves are formed by clinch tong halves. A clinch tongs is used in the production process of clinching, which is also known as through joining. Through joining is a method for joining metal sheets without using an additional material. In the case of a crimping tool, the gripper halves are formed by crimping tool halves. Crimping can be understood as a joining process in which two components are joined to each other by plastic deformation. Crimping is a special form of beading. Clinch tongs and crimping tools each have a punch and a bottom die as contact elements.

In one system according to the invention of a welding tongs and a control device for operating the welding tongs, the control device can be set up to carry out one or more of the described embodiments of the method according to the invention.

In one system according to the invention of a clinch tongs and a control device for operating the clinch tongs, the control device can be set up to carry out one or more of the described embodiments of the method according to the invention.

In one system according to the invention of a crimping tool and a control device for operating the crimping tool, the control device can be set up to carry out one or more of the described embodiments of the method according to the invention.

In one system according to the invention of a gripping tool and a control device for operating the gripping tool, the control device can be set up to carry out one or more of the described embodiments of the method according to the invention. The control device for operating the gripping tool may be a robot controller of an industrial robot, which is connected in particular to the gripping tool and guides it.

One concrete embodiment of the invention is explained as an example in the attached figures, using the example of a welding tongs.

DETAILED DESCRIPTION

A method for referencing a drive position of a drive of at least one gripper half of an electric-motor production gripper in a closed position of two gripper halves without force sensors is explained below, using the example of a welding tongs. Such gripping tools may be welding tongs, as illustrated, but also clinch tongs or crimping tools. These are able to function without a force sensor. In particular sensorless, in particular force-sensorless gripping tools may be connected in this case for example to a robot arm of a robot, as shown in the exemplary embodiment in the following FIG. 2.

Figure 1:
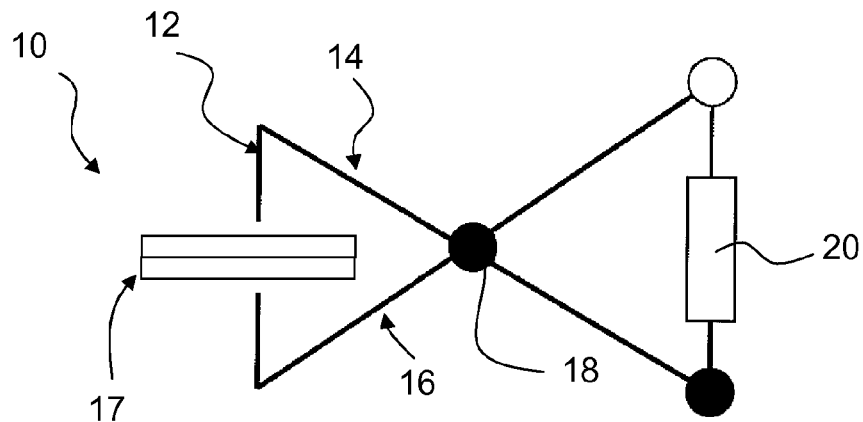
FIG. 1 a schematic view of a welding tongs with tong arms arranged in a X shape, FIG. 2 an industrial robot with a robot arm having a plurality of members, FIG. 3 a depiction of a diagram with a tracking error characteristic line.

FIG. 1 shows, as an example of a production gripper 10, a welding tongs 12, for example having gripper halves 14, 16 arranged in an X shape. At their front end, the gripper halves 14, 16 each have for example an electrode, for example with an electrode cap (not shown). As shown in FIG. 1, the first gripper half 14 is designed so that it is movable around an axis of rotation 18. The second gripper half 16 may be fixed or movable. A drive 20, in this case a gripper motor, is provided to swivel the first gripper half 14 around the axis of rotation 18 relative to the second gripper half. Drive 20 is for example an electric drive, for example an electric motor.

By means of the drive 20, the first gripper half 14 can be moved relative to the second gripper half 16 between a closed position and an open position. In the closed position, the two gripper halves 14, 16 are brought for example close enough together so that they are in contact on different sides with a measuring body 17 of known thickness.

The production gripper 10, such as the welding tongs 12 shown in FIG. 1, may be stationary or may be moved by an industrial robot 22, as shown for example in the following FIG. 2, or some other manipulator.

Figure 2:
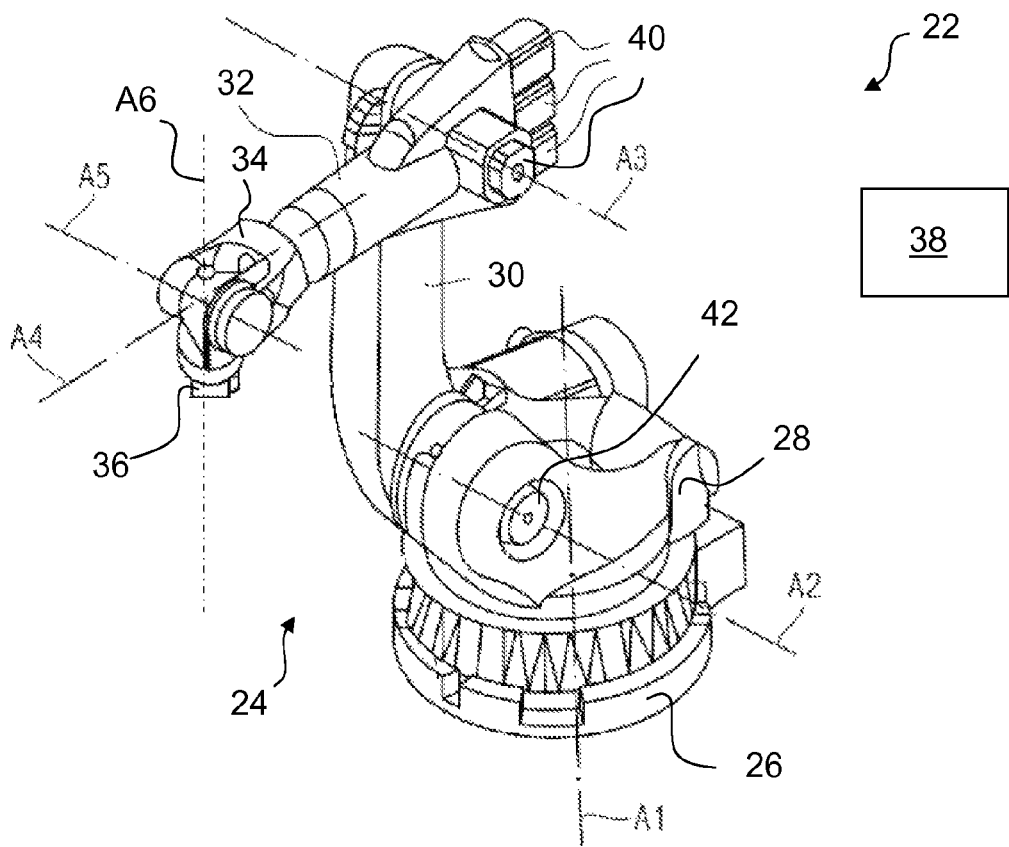

FIG. 2 shows a perspective view of an exemplary embodiment of an industrial robot 22 having for example a robot arm 24. In the case of the exemplary embodiment shown in FIG. 2, robot arm 24 includes a plurality of members, arranged sequentially and connected by joints. In the depicted exemplary embodiment, the industrial robot 22 has a base 26. In this case, a carousel 28 that is rotatably mounted relative to the base 26 is provided. The carousel 28 is mounted so that it is rotatable relative to the base 26 around a vertically running axis A1, which is also referred to as Axis 1. Other joints of robot arm 24 in the case of the present exemplary embodiment are a motion link 30, an extension arm 32 and a preferably multiaxial robot hand 34 having a flange 36. Motion link 30 is mounted at the lower end on carousel 28, for example on a swivel bearing head that is not shown in further detail, so that it can swivel around a preferably horizontal axis A2, which is also referred to as Axis 2. At the upper end of motion link 30, extension arm 32 in turn is mounted so that it can swivel around a likewise preferably horizontal axis A3. At its end this arm carries robot hand 34, with its preferably three axes A4, A5, A6.

In order to move industrial robot 22 or its robot arm 24, the latter includes drives, in particular electric drives, that are connected in a generally known way to a control device 38. Only some of the electric motors 40, 42 of these drives are shown in FIG. 1.

Attached to the robot hand 34 or its flange 36 may be a production gripper 10, such as for example the welding tongs 12 according to FIG. 1, and may be referenced according to the method described below in reference to FIG. 3.

Heretofore there have been methods for automatically adjusting or referencing, i.e., setting a zero position of the tool, of welding tongs and similarly designed tools. However, these method are based on the interpretation of a signal of an internal or external force sensor at the welding tongs or the gripper motor with which the welding tongs are moved.

Using the rise in the force sensor signal, a contact point of the electrodes of the welding tongs can be determined, and the tongs can then be calibrated to the contact point thus determined. The contact point in this case is for example the point at which the welding tongs, or more precisely, the electrodes of the two gripper arms of the welding tongs, come into contact with a workpiece or with each other.

These methods are not applicable however to welding tongs or tools without a force sensor. However, force-sensorless welding tongs have the broadest distribution in the market in installed production cells.

A method will therefore be provided, with the help of which even force-sensorless gripping tools or tong tools, such as force-sensorless welding tongs, clinch tongs or crimping tools, can be calibrated automatically, i.e., without human intervention or assistance.

Figure 3:
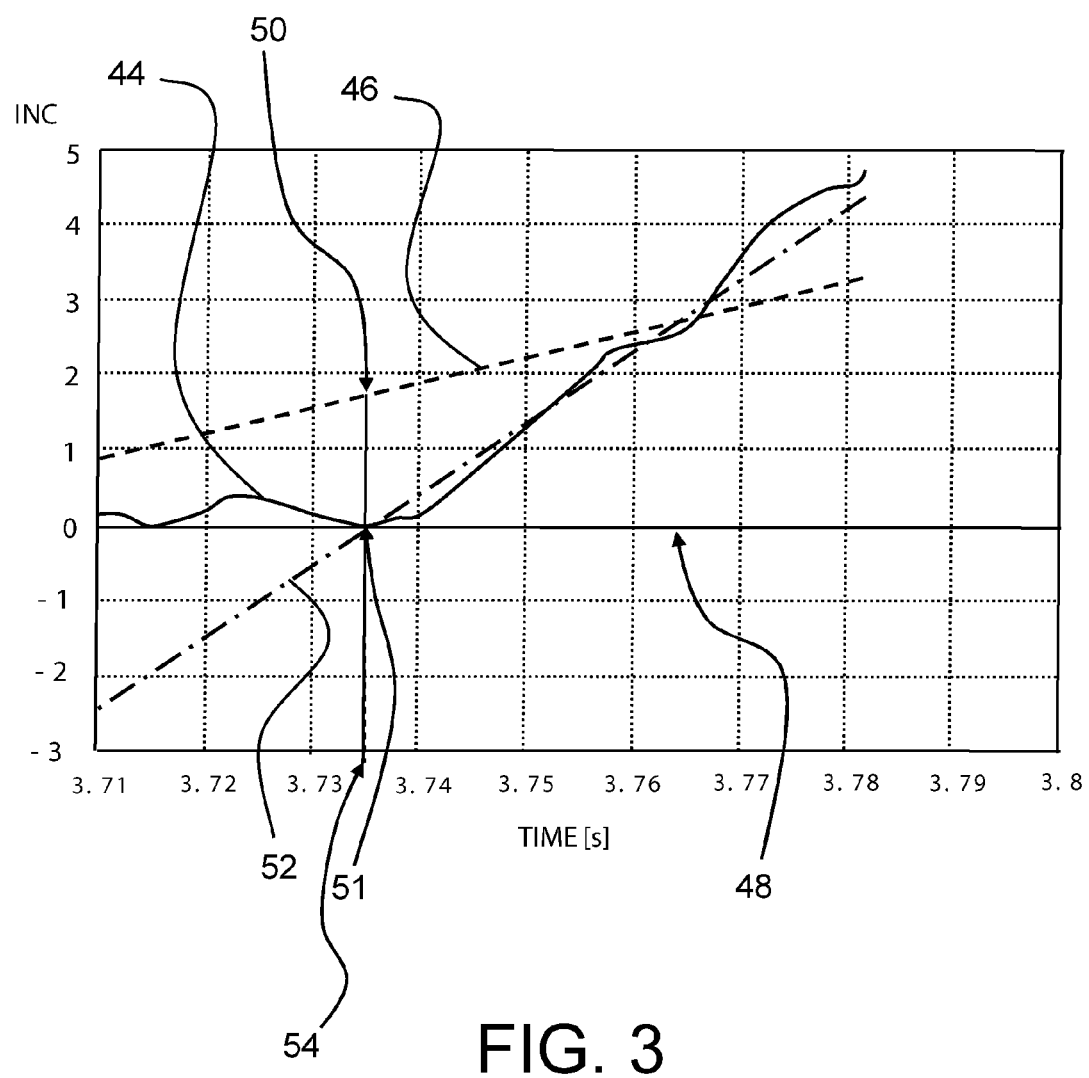

FIG. 3 shows a depiction of a tracking error characteristic 44 of a gripping or tong tool, for example the welding tongs described above.

The diagram depicted in FIG. 3 shows the actual positions 46 of the welding tongs depending on the time, joined as a dashed line. The time is plotted in this case for example in seconds on the X axis, and the position of the welding tongs for example in increments INC on the Y axis.

As can be seen from the diagram, the gripping tool or tong tool, for example a force-sensorless welding tongs, is moved at a constant speed into a closed position, in which the two gripper arms of the welding tongs are moved close enough together so that they come in contact on different sides for example with a workpiece, in this case a welding object, and finally are pressed against the workpiece or welding object at a predetermined welding pressure.

In addition, tracking error values 44 or filtered tracking error values of the welding tongs are depicted as a solid line. The tracking error in this case is the difference between the target position and the actual position of the gripping or tong tool, in this case for example the welding tongs or its movable welding tong arm in the case of an X-welding tong, at the respective points in time.

The tracking error 44 can be determined in this case for example on the basis of a monitored current of the gripper motor which operates the welding tongs.

The tracking error, as shown in the diagram in FIG. 3, varies initially in the vicinity of a zero position 48 in which the tracking error is zero, as long as the gripper arms of the welding tongs are not touching during the closing of the welding tongs or the contact point of the welding tongs is not reached by the movable gripper arm.

But as soon as the welding tongs is in the closed position and the gripper arms of the welding tongs have reached the contact point in which they are touching each other or a workpiece or welding object, and the buildup of the welding force begins, the tracking error 44 or the course of the tracking error rises, as shown in FIG. 3.

To determine the contact point 50, in one embodiment of the invention a tracking error regression is specified, which is plotted in FIG. 3 as a dash-dotted line. In the present exemplary embodiment as shown in FIG. 3, a regression line 52 of the tracking error is stipulated as the tracking error regression, which is plotted in the diagram as a dotted line. The zero crossing of this regression line 52 at point 51 then corresponds at least in very close approximation to the instant or contact instant 54 at which the gripper arms of the welding tongs have reached the contact point.

An adjusting or referencing of a gripping or tong tool, such as for example the welding tongs now proceeds according to the following automated process.

The gripping or tong tool is closed for example at a low or constant speed or a low or constant rotational speed of the drive of the gripping or tong tool. That results in a course of the actual position 46 of the gripping or tong tool as depicted in the exemplary embodiment in FIG. 3 by a dashed line.

In defined position steps or time steps, it can be checked whether a torque limit, set previously to protect the gripping or tong tool, in this case the welding tongs, has been reached yet.

The application of the welding force or electrode force in a welding tongs normally occurs in a torque operation. In this case, to apply a desired welding force of the welding tongs, a motor current corresponding to this welding force is specified, in order to thereby reach a defined motor torque of the drive of the welding tongs with which the welding tongs is operated.

The torque limit which correlates with the welding force can be chosen so that the torque limit for example corresponds to a predetermined welding force or electrode force of the welding tongs to be applied.

During the entire process of closing the gripping or tong tool, the current position data of the gripping or tong tool and the tracking error of the gripping or tong tool are determined and stored at intervals, in particular at cyclical intervals, i.e., for example in predetermined position steps or time steps. The tracking error corresponds in this case, as described earlier, to the difference between the target position and the actual position of the gripping or tong tool.

As soon as the torque limit has been reached and the gripper arms of the welding tongs are touching and the predetermined welding force has been built up, it is possible to reach conclusions about the contact point 50 or the adjustment position of the gripping or tong tool from the stored tracking error values, which for example rise uniformly at a constant target speed, after the contact point has been passed.

To this end, in one embodiment a regression of the tracking error values is calculated. As shown in the exemplary embodiment in FIG. 3, a regression line 52 for example can be calculated using the measured tracking error values. The regression line 52 is depicted in FIG. 3 by a dash-dotted line, as described earlier.

The regression line 52 can be calculated in this case for example starting from a tracking error value ascertained for example empirically, until the torque limit and thus a predetermined welding force have been reached.

This tracking error value should in this case preferably only be able to be caused by the buildup of force, in this case the buildup of welding force, and preferably no longer by frictional forces.

The zero crossing of this regression line 52 then corresponds at least in very good approximation to the instant 54 at which the contact by the two tool halves or gripper or tong arms of the gripping or tong tool, for example the electrode caps of the two electrode or gripper arms of the welding tongs, has occurred.

As shown in the exemplary embodiment in FIG. 3, the actual position of the gripping or tong tool can be determined in this case for example in increments INC of 1000 INC, and the tracking error value in increments INC of for example 0.01 INC.

On the basis of the ascertained tracking error values, a regression line 52 can now be calculated starting from a tracking error value ascertained for example empirically, until the torque limit is reached. To that end, tracking error values are used from the range in which the tracking error is rising, for example rising uniformly, as shown in FIG. 3.

By storing, in particular time-synchronously, the position data and the tracking error data of the gripping or tong tool, in this case for example the welding tongs, the contact position 50 can also be calculated in a simple way.

The frictional forces occurring for example in the bearings and electrode pathways of the welding tongs have no influence on this process, since they lead either to a constant offset or a constant misalignment of the tracking error signal or a short-term rise in the tracking error signal.

Both disturbances are eliminated from the determination of the contact point 50, if the mean tracking error during for example a constant travel phase (tracking_error_mean_constant_travel) is deducted from the Y offset or Y mismatch of the regression line due to the rising tracking error. In a constant travel phase, the gripping or tong tool is closed with a constant speed or constant rotational speed of the gripper or tong motor.

This yields the following formulas:

Tracking_error_during_force_buildup=(tracking_error_slope×time)+tracking_error_offset Tracking_error_instant=(tracking_error_mean_constant_travel−tracking_error_offset)/tracking_error_slope Adjustment_position=contact_position=gripping_or_tong_tool_position (contact instant)

If it should turn out in this case that the calculated contact point 50 lies before the starting position of the measuring travel, then it may be assumed that the gripping or tong tool was already closed at the beginning of the measuring travel. The new search travel or measuring travel therefore begins an adequate distance ahead of the contact point ascertained in the first step. In other words, the starting position of the measuring travel is chosen so that it lies ahead of the contact point of the welding tongs.

This procedure can be refined still further by an iterative repetition of the measurement.

To ascertain the contact point or the adjustment position of the tool automatically, this procedure is refined by the previously described procedure being automated or programmed in a controller of the tool or robot.

Besides a robot, the gripping tool or tong tool can also be moved by some other manipulator, or even provided stationary.

What is claimed is:

1. A method for referencing a drive position of an electric drive of at least one gripper half of a production gripper in a closed position of two gripper halves, comprising:
    closing of the two open gripper halves by electric-motor operation of the drive;
    determining multiple actual positions of the at least one electric drive and of tracking error values of the electric drive in a time interval during the closing of the gripper halves until beyond a point in time in which the closed position is reached;
    determining a straight line, in particular by means of adjustment computation on the basis of the ascertained tracking error values, depending on a related time-tracking-error function, starting from tracking error values at the end of the time interval;
    determining the instant of the zero crossing of the ascertained straight line of the time-tracking-error function; and
    determining the actual position of the at least one electric drive as the closed position, that corresponds to the instant of the zero crossing of the straight line of the time-tracking-error-function.

2. The method according to claim 1, wherein the closed position of the two gripper halves is reached at the instant of a mutual contact of two contact elements of the two gripper halves.

3. The method according to claim 1, wherein the closed position of the two gripper halves is reached at the instant when contact elements of the two gripper halves touch opposite sides of a measurement body of known size.

4. The method according to claim 1, wherein a determination of the straight line, in particular a regression line, is performed by regression as an adjustment computation.

5. The method according to claim 1, wherein the multiple determination of the actual positions of the at least one drive and/or of the tracking error values of the electric-motor-actuated drive takes place in predefined, in particular constant position steps and/or time steps.

6. The method according to claim 5, wherein the actual positions and the tracking error values are determined time-synchronously.

7. The method according to claim 1, wherein the closing of the two open gripper halves takes place through electric-motor operation of the drive at a constant speed, in particular a constant rotational speed of an electric motor which operates the drive.

8. The method according to claim 7, wherein the actual position of the at least one drive determined as the closed position, which corresponds to the zero crossing of the straight line of the time-tracking-error function, is determined using a mean tracking error, a slope of the regression line of a tracking error, and/or a tracking error offset.

9. A system of a welding tongs and a control device for operating the welding tongs, which is set up to carry out a method according to claim 1.

10. A system of a clinch tongs and a control device for operating the clinch tongs, which is set up to carry out a method according to claim 1.

11. A system of a crimping tool and a control device for operating the crimping tool, which is set up to carry out a method according to claim 1.

12. A system of a gripping tool and a control device for operating the gripping tool, which is set up to carry out a method according to claim 1.

* * * * *